United States Patent [19]

Billman

[11] 3,753,148
[45] Aug. 14, 1973

[54] INFRARED TUNABLE LASER

[75] Inventor: Kenneth W. Billman, Mountain View, Calif.

[73] Assignee: The United States of America as represented by the Administration of the National Aeronautics and Space Administration

[22] Filed: Apr. 6, 1972

[21] Appl. No.: 241,615

[52] U.S. Cl. ............................................. 331/94.5
[51] Int. Cl. ............................................. H01s 3/10
[58] Field of Search ............... 331/94.5; 330/4.3; 350/160

[56] References Cited
UNITED STATES PATENTS 3,605,039   9/1971   Harris et al. ..................... 331/94.5
3,628,044   12/1971  Young et al. ..................... 331/94.5

Primary Examiner—William L. Sikes
Attorney—Darrell G. Brekke et al.

[57] ABSTRACT

A tunable laser apparatus including a first wavelength selective reflector and a second wavelength selective reflector forming one end of an optical cavity, a third wavelength selective reflector forming the other end of the optical cavity, a first lasable dye solution for developing radiation of a wavelength selected by the first reflector and a second lasable dye solution for developing radiation of a wavelength selected by the second reflector disposed within the optical cavity, and a non-linear mixing crystal disposed within the optical cavity. The selected radiation is passed through the non-linear mixing crystal causing it to develop radiation of a third wavelength which is transmitted out of the optical cavity through the third reflector.

8 Claims, 2 Drawing Figures

PATENTED AUG 14 1973 3,753,148
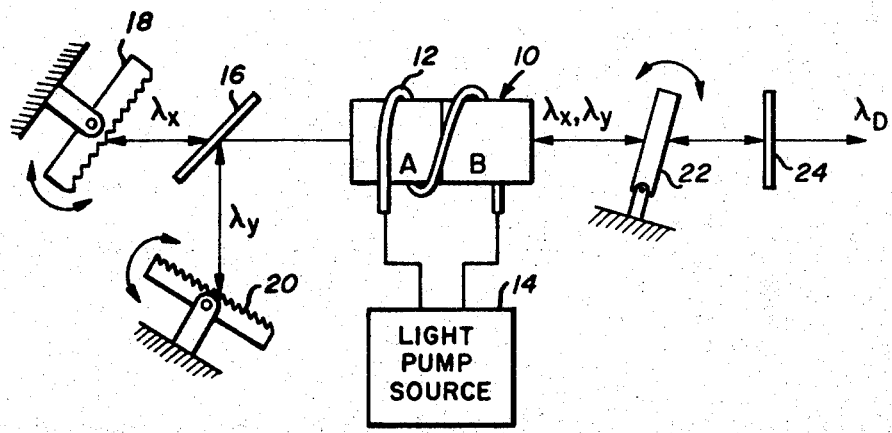
Fig_1
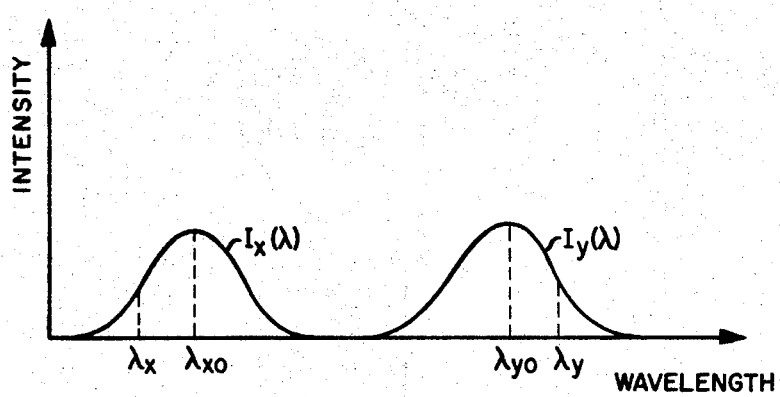
Fig_2

INFRARED TUNABLE LASER

This invention described herein was made by an employee of the United States Government and may be manufactured and used by or for the Government for governmental purposes without the payment of any royalties thereon or therefor.

SUMMARY OF THE PRESENT INVENTION

The present invention relates generally to laser apparatus and more particularly to apparatus for providing an intense source of coherent laser radiation which is tunable from the visible wavelengths through the infrared wavelengths.

Briefly, the presently preferred embodiment includes a dye cell containing at least two dyes either mixed or disposed in separate compartments, a pair of diffraction gratings disposed in cooperating relationship with a dichroic mirror to form one end of an optical cavity including the dye cell, an output mirror forming the other end of the optical cavity, and a non-linear mixing crystal disposed within the cavity. When the dye cell is optically pumped, the respective dyes are caused to lase over separate radiation bands and the diffraction gratings and dichroic mirror permit small sub-bands of radiation to be selected and returned through the dye cell for amplification. As the radiation in the sub-bands pass through the non-linear mixing crystal, an output wavelength develops which is a function of the two wavelengths selected by the diffraction gratings. By proper choice of mirrors, dyes and crystals, the output wavelength is tunable from approximately 0.5 to 20 $\mu$.

The present invention has particular utility as a means with which to perform absorption spectroscopy of atoms and molecules, and has further utility in the detection and monitoring of chemical species and their densities in plasmas, liquids and gases, such as pollution in the atmosphere, for example. Other fields of utility for the present invention will no doubt become apparent to those of ordinary skill in the art after having read the following detailed description of a preferred embodiment which is illustrated in the drawing.

IN THE DRAWING

FIG. 1 is a diagram schematically illustrating a presently preferred embodiment of a tunable laser in accordance with the present invention;

FIG. 2 is a graph used to illustrate certain features of the embodiment shown in FIG. 1.

DETAILED DESCRIPTION OF THE PREFERRED EMBODIMENT

Referring now to FIG. 1 of the drawing, apparatus is shown for providing an intense source of coherent laser radiation which is turnable over a wide range of output wavelengths (including at least the band including wavelengths of from 0.5 to 20 $\mu$). As illustrated, the apparatus includes a laser active medium 10 comprised of at least two lasable dyes or other lasable materials, either mixed or disposed in separate cells or compartments A and B, a flashlamp or other suitable light-pumping means 12 for causing a population inversion of the dyes contained in laser medium 10, and a light-pump source 14 for driving light-pumping means 12. In addition, the apparatus includes a dichroic mirror 16, a pair of rotatable diffraction gratings 18 and 20, a rotatable non-linear mixing crystal 22, and an output mirror 24.

The dyes contained within medium 10 are selected so as to lase over two radiation bands $I_x(\lambda)$ and $I_y(\lambda)$ which are respectively centered at wavelengths $\lambda_{x0}$ and $\lambda_{y0}$ as indicated in FIG. 2 of the drawing.

There are at least 69 dyes which could be used in this laser. The choice of which two to use is based on three considerations:

1. Compatability, viz. can they be mixed in a single cell and still retain their ability to lase. This restriction can be ignored if the double cell embodiment is used.
2. The range of output IR wavelengths desired from the laser. From the mixing formula, $\lambda_D = \lambda_x \lambda_y / (\lambda_y - \lambda_x)$, it is clear that if it is desired to have $\lambda_D$ in a certain range, then $\lambda_x$ and $\lambda_y$ must be tunable over ranges which mathematically allow this from the formula.
3. To maximize the output power of the IR wavelength $\lambda_D$, one can show that the product of powers of the two wavelengths being mixed should be a maximum.

$$P_D \propto P(\lambda_x) P(\lambda_y).$$

Now certain dyes lase very intensely, others are weaker. It is clear from the formula that one approach is to choose a very intense dye, giving $p(\lambda_x)$, say, and then see if a second dye which is not so intense perhaps, but satisfies conditions (1) and (2), above, exists.

A consistent investigative program of pairing such dyes according to these constraints has not yet been undertaken. We have chosen two dyes which fortunately have been found to satisfy these constraints:

Rhodamine 6G and Cresyl Violet. The first was chosen since it is the most intense of all known lasing dyes. The second was chosen to satisfy (1) and (2). Initial experiments have shown this to be the case. We are now proceeding with a program to optimize the concentrations of the two dyes so as to maximize $P(\lambda_x) P(\lambda_y)$.

A discussion of various other dyes which may be used in laser medium 10 may be found in "Flashlamp-Pumped Laser Dyes: A Literature Survey," by J.T. Warden and Lucille Gough, Applied Physics Letters, Vol. 19, No. 9, Nov. 1, 1971, pp. 345-348.

The dichroic mirror 16 is chosen to have the characteristics of reflecting radiation within the band $I_y(\lambda)$, and transmitting radiation within the band $I_x(\lambda)$. In addition, mirror 16 must have the characteristics of blocking wavelengths in the band $I_y(\lambda)$ and not reflecting wavelengths in the band $I_x(\lambda)$. A dichroic mirror is state of the art with modern optical coating techniques and can be obtained from a large number of mirror suppliers. Essentially two coatings are put onto the glass substrate; an anti-reflection coating for the wavelength which is to be transmitted, and a sharply peaked reflection coating for the wavelength which is to be reflected. The use of a dichroic mirror is not essential here, although it is advantageous. If a simple glass beam splitter were used, which had a broad band coating (i.e., over a large wavelength range) giving approximately 50 percent transmission and 50 percent reflection for both $\lambda_x$ and $\lambda_y$, the device should still work. In this case, of course, the "Q" of the cavity would be somewhat less, i.e., the output power at each wavelength would be lowered. However, the gratings would still act as wavelength "sorters" and 18 would only reflect back $\lambda_x$ while 20 would only reflect back $\lambda_y$. The 50 percent of $\lambda_y$ transmitted through the beamsplitter would of course be lost, since 18 would reflect it at an angle and hence out of the cavity. A similar statement holds for the 50 percent of $\lambda_x$ reflected onto 20.

The diffraction grating 18 is rotatably disposed and positioned angularly with respect to the incident radiation so as to have high reverse reflectivity for a small sub-band of radiation (approximately 1 angstrom in width) at a chosen wavelength $\lambda_x$. Similarly, grating 20 is angularly positioned relative to the radiation reflected by mirror 16 so as to highly reflect a small band of radiation (approximately 1 angstrom in width) at the chosen wavelength $\lambda_y$ back into mirror 16. The reflected radiation $\lambda_x$ and $\lambda_y$ is then passed back through laser mediums 10 and amplified.

Mirror 24 is chosen to have very high (approximately 100 percent) reflectivity over the wavelengths encompassed by $I_x(\lambda)$ and $I_y(\lambda)$ and to have high transmittance in the wavelength region of the desired output IR wavelengths $\lambda_D$. Hence, ignoring the effects of mixing crystal 22 for a moment, it will be noted that the radiation subbands $\lambda_x$ and $\lambda_y$ are totally reflected back into laser medium 10 for further amplification. Accordingly, these wavelengths build up to high intensity inside the cavity formed by gratings 18 and 20 at the one end and mirror 24 at the other end and never exit the cavity.

However, in passing through the mixing crystal 22, an additional wavelength $\lambda_D$ is developed having a wavelength defined by the expression $$\lambda_D = \lambda_x \lambda_y / (\lambda_y - \lambda_x).$$

This expression is well known and its derivation need not be discussed. See "The Interaction of Light with Light" by J.A. Giordmaine, Scientific American, April 1964, pp. 38–49.

By proper choice of mirrors, dyes, and crystals, the gross tuning range of the infrared radiation is chosen. By rotation of one (or both) of the gratings and the crystal, fine tuning in this range is effected. For example, if the dyes mentioned above are used:
Rhodamine 6G: $\lambda_y = (0.57 \pm 0.1)\ \mu$ (ie., the band is from 0.56 to 0.58 $\mu$ or 5600 A to 5800 A)
Cresyl Violet: $\lambda_x = (0.656 \pm 0.1)\ \mu$
Tunability: $\lambda_D = 4.25\ \mu$ at center or by tuning the gratings can range from $\lambda_D = 3.5\ \mu$ to $80_D = 5.67\ \mu$.

However, if the convenient mixing crystal lithium niobate ($LiNbO_3$) is used, it does not transmit radiation longer than 5 $\mu$. So the actual range will be $$3.5\ \mu \leq \lambda_D \leq 5.0\ \mu.$$

There are many additional crystals suitable for use in the illustrated embodiment; for example, proustite ($Ag_3 A_5 S_3$) and pyragyrite ($Ag_3 Sb S_3$).

The apparatus of the present invention may be constrasted to the prior art apparatus dislosed by C.F. Dewey et al in Applied Physics Letters, Vol. 18, No. 2, Jan. 15, 1971, pp. 58–60. In the Dewey apparatus, a ruby laser is used to pump a dye laser containing a single dye to produce an output band of wavelengths. Mirrors reflect both the ruby wavelengths and the dye wavelengths through a mixing crystal which, when properly oriented, mixes the frequencies of the two beams to give a band of difference frequency radiation having a wavelength $\lambda$ where $$\lambda = \lambda_D \lambda_R / (\lambda_D - \lambda_R)$$

where
$\lambda_R$ is the ruby wavelength and
$\lambda_D$ is any spectrum of wavelengths which can be emitted by the dye laser.

One of the problems associated with this prior art apparatus is that it suffers from the complexity, bulkiness and cost of the ruby laser which must be used in the system. These properties seriously detract from the usefulness of the apparatus, especially if it is to be used in a portable embodiment such as a pollution detector. The absence of the ruby laser from the present invention is thus one important distinction over the prior art.

A further distinction of the present invention over the prior art is that the mixing crystal 22 is disposed inside the laser cavity where the power of the radiation is one or two orders of magnitude higher than in the case where the crystal is disposed outside the cavity, since the output power of the difference ratio depends on this power in a quadratic fashion. It is, of course, impossible to arrange the crystal within the cavity of the above described prior art device since only $\lambda_R$ is present in the ruby laser cavity and only $\lambda_D$ is present in the dye laser cavity, and the crystal must have both wavelengths incident upon it.

In the illustrated preferred embodiment, the laser operates in a pulse mode corresponding to the pulse flashlamp pumping of the laser medium 10. However, the apparatus may alternatively be operated in the CW (continuous wave) mode if the gain is made high enough, since there is no intrinsic limitation of the system which would prevent CW infrared output.

Although the laser medium 10 is discussed above in terms of a two dye embodiment, it will be appreciated that more than two independent dye cells and pumping configurations may be incorporated into the cavity so long as the lasing of the cells is synchronized so that the resultant wavelengths are simultaneously present in the crystal 22.

Furthermore, where a wide band infrared source is desirable, one of the gratings 18 or 20 may be replaced with a totally reflecting mirror so as to give a band of infrared radiation ranging from $$\lambda_{D_{min}} = \frac{\lambda_x \lambda_{y_1}}{\lambda_{y_1} - \lambda_x}$$

to $$\lambda_{D_{max}} = \frac{\lambda_x \lambda_{y_2}}{\lambda_{y_2} - \lambda_x}$$

where
$\lambda_{y_1}$ is the longest lasing wavelength in the band of $I_y(\lambda)$, and
$\lambda_{y_2}$ is the shortest wavelength in the band of $I_y(\lambda)$.

Although the present invention is specifically designed to eliminate the need of an external laser for pumping the dye, in order to attain special output characteristics, it may be desirable to use external laser pumping. For example, if a regular pulse train of tunable IR radiation is desired, an alternate way to the somewhat difficult technique of using fast repetitive pulsing of the flashlamps would be to pump the dye with a laser such as that disclosed by R.C. Greenhow et al. in Applied Physics Letters, Volume 12, No. 2, June 1, 1968, pp. 390–391. The Greenhow laser produces a regular train of pulses having at least 500 microseconds duration with 10 microseconds pulse separation where each pulse is approximately 5 microseconds in temporal duration. Using such a laser to pump the dye in the apparatus of the present invention, a similar pulse train of IR radiation may be obtained.

Perhaps the principle advantages of the present invention reside in the simplicity and low cost. As pointed out above, the apparatus does not require the use of the Q-switched ruby laser which is costly, bulky and difficult to align and maintain. The dye laser used in the present invention is about a factor of 10 better in these considerations. Since one of the primary applications of a tunable laser may well be in the field of portable pollution detection devices, it is clear that the reduced cost, simplicity, etc., are of substantial importance.

What is claimed is:

1. Laser apparatus comprising:
   a first laser material capable of lasing in a first radiation band;
   a second laser material capable of lasing in a second radiation band;
   means for optically pumping said laser materials;
   first and second mirrors spaced from opposite end portions of said laser materials, said first mirror being positioned at an angle to the optical axis of said laser and said second mirror being positioned perpendicular to said optical axis;
   said first mirror having the characteristics of transmitting radiation in said first band and reflecting radiation in said second band;
   a mixing crystal located between said laser materials and said second mirror;
   a first means angularly positioned with respect to said first mirror for reflecting radiation at wavelength $\lambda_x$ onto said first mirror and through said laser materials and said mixing crystal onto said second mirror;
   a second means angularly positioned with respect to said first mirror for reflecting radiation at wavelength $\lambda_y$ through said first mirror, said laser materials and said mixing crystal onto said second mirror;
   said second mirror having the characteristics of reflecting radiation at wavelengths $\lambda_x$ and $\lambda_y$ and transmitting radiation at wavelength $\lambda_D$ which is a function of wavelengths $\lambda_x$ and $\lambda_y$; said first and said second mirrors and said first and said second reflecting means together defining an optically resonant cavity for said laser.

2. Apparatus as set forth in claim 1 wherein said laser materials are dye solutions.

3. Apparatus as set forth in claim 2 wherein said dye solutions are intermixed.

4. Apparatus as set forth in claim 2 wherein said dye solutions are contained in adjacent compartments.

5. Apparatus as set forth in claim 1 wherein said first and second reflecting means each comprises a rotatable diffraction grating.

6. Apparatus as set forth in claim 1 wherein $$\lambda_D = (\lambda_x \lambda_y)/(\lambda_y - \lambda_x).$$

7. Apparatus as set forth in claim 1 wherein said first reflecting means is tunable permitting the wavelength of $\lambda_x$ to be varied, and said second reflecting means is tunable permitting the wavelength of $\lambda_y$ to be varied.

8. A tunable laser apparatus comprising:
   first and second laser materials interposed between first and second mirrors, said first mirror being positioned at an angle to the optical axis of said laser and said second mirror being positioned perpendicular to said optical axis;
   an excitation source for optically pumping said laser materials;
   said first and second laser materials being capable of lasing in first and second radiation bands which include wavelengths $\lambda_x$ and $\lambda_y$, respectively;
   said first mirror being capable of transmitting radiation in said first band and reflecting radiation in said second band;
   a non-linear mixing crystal located between said laser materials and said second mirror;
   a first rotatable diffraction grating angularly positioned with respect to said first mirror and adjusted to reflect radiation of wavelength $\lambda_x$ through said first mirror, said laser materials and said mixing crystal onto said second mirror;
   a second rotatable diffraction grating angularly positioned with respect to said first mirror and adjusted to reflect radiation of wavelength $\lambda_y$ onto said first mirror through said laser materials and said mixing crystal onto said second mirror;
   said second mirror having the characteristics of reflecting radiation at wavelengths $\lambda_x$ and $\lambda_y$ and transmitting radiation at wavelength $\lambda_D$ which is a function of wavelengths $\lambda_x$ and $\lambda_y$; said first and said second mirrors and said first and said second gratings together defining an optically resonant cavity for said laser.

* * * * *